United States Patent
Chen et al.

(10) Patent No.: US 9,097,940 B2
(45) Date of Patent: Aug. 4, 2015

(54) LCD PANEL HAVING OBSTRUCTING FRAMES AND METHOD OF MANUFACTURING THE SAME

(75) Inventors: Yong Chen, Beijing (CN); Chengtan Zhao, Beijing (CN); Jian Guo, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 258 days.

(21) Appl. No.: 12/835,030

(22) Filed: Jul. 13, 2010

(65) Prior Publication Data
US 2011/0013132 A1    Jan. 20, 2011

(30) Foreign Application Priority Data

Jul. 14, 2009  (CN) .......................... 2009 1 0088921

(51) Int. Cl.
  *G02F 1/161*  (2006.01)
  *G02F 1/1339*  (2006.01)
(52) U.S. Cl.
  CPC .................................... *G02F 1/1339* (2013.01)
(58) Field of Classification Search
  CPC .................... G02F 1/1339; G02F 2001/13396;
        G02F 1/161; G02F 1/0107; G02F 1/13394
  USPC .................................................. 349/153, 190
  See application file for complete search history.

(56) References Cited

U.S. PATENT DOCUMENTS

| 8,134,680 | B2 * | 3/2012 | Hirato | 349/187 |
| 2005/0073638 | A1 * | 4/2005 | Byun et al. | 349/156 |
| 2006/0221293 | A1 * | 10/2006 | Hirakata | 349/153 |
| 2006/0262267 | A1 * | 11/2006 | Sekiguchi | 349/187 |
| 2008/0129946 | A1 * | 6/2008 | Chan et al. | 349/153 |

FOREIGN PATENT DOCUMENTS

WO    WO-2009-041126    *   4/2009    .................... 349/190

* cited by examiner

*Primary Examiner* — Lauren Nguyen
(74) *Attorney, Agent, or Firm* — Ladas & Parry LLP

(57) ABSTRACT

A liquid crystal display (LCD) panel, comprising a first substrate and a second substrate assembled face to face, each having a display area and a peripheral area around the display area, liquid crystal, and sealant formed between the peripheral area of the first substrate and the peripheral area of the second substrate. On the first substrate, at least one first obstructing frame is formed between the sealant and the display area of the first substrate; on the second substrate, at least one second obstructing frame is formed between the sealant and the display area of the second substrate; the first obstructing frame and the second obstructing frame are disposed at an interval and parallel to each other; each of the first obstructing frame and second obstructing frame has a thickness smaller than a cell gap, and a sum of the thicknesses of a pair of the first obstructing frame and second obstructing frame that are adjacent to each other is greater than the cell gap.

15 Claims, 3 Drawing Sheets

LCD PANEL HAVING OBSTRUCTING FRAMES AND METHOD OF MANUFACTURING THE SAME

BACKGROUND

Embodiments of the invention relate to a liquid crystal display (LCD) panel and the manufacturing method thereof.

In recent years, thin film transistor liquid crystal displays (TFT-LCD) have been gaining popularity in the market, as they require low energy and low cost and are radiation-free. A LCD panel for a TFT-LCD mainly comprises a color filter (CF) substrate and an array substrate, which are assembled face to face, as well as a liquid crystal layer filled between the two substrates. The assembling process of a LCD panel can be performed through filling liquid crystal with a method of one drop filling (ODF), which comprises, for example, applying sealant in the peripheral area of a prepared array substrate, and dropping liquid crystal on the display area of the array substrate; and then assembling, with precision, a CF substrate and the array substrate face to face, and hardening the sealant so as to join the two substrates together.

Generally, liquid crystal is dropped on the central portion of the display area, and gradually diffuses to the peripheral area. During diffusion of the liquid crystal into the peripheral area, if the sealant disposed in the peripheral area, before fully hardened, comes into contact with the liquid crystal, the sealant that is not fully hardened will pollute the liquid crystal, which leads to deficiencies such as low display quality of the produced LCD panel. As shown in FIG. 1, to eliminate pollution to liquid crystal by the sealant that is not fully hardened, an obstructing frame 53 with a thickness slightly larger than or equal to the thickness of the liquid crystal cell (i.e., the cell gap of the LCD panel) is provided in the peripheral area, so as to prevent the liquid crystal 4 that is diffusing to the peripheral area from contacting the not-fully-hardened sealant 3. After the CF substrate 2 and the array substrate 1 are assembled together face to face, the two substrates push the obstructing frame 53 from above and below, so that the liquid crystal 4 in the display area is completely insulated from the sealant 3 in the peripheral area.

The above technique provides an obstructing frame 53 with a thickness slightly larger than or equal to the thickness of the liquid crystal cell in the peripheral area of a LCD panel. It reduces the chance of pollution to liquid crystal by not-fully-hardened sealant during the assembling process of a LCD panel. The technique nevertheless has the following deficiency: the total amount of the liquid crystal in the display area may vary at the time before the liquid crystal cell of a LCD panel deforms and after the deformation vanishes, which leads to unstable product quality and display characteristics of a LCD panel.

SUMMARY

An embodiment according to the present invention provides liquid crystal display (LCD) panel, comprising a first substrate and a second substrate assembled face to face, each having a display area and a peripheral area around the display area, liquid crystal filled between the first substrate and the second substrate, and sealant formed between the peripheral area of the first substrate and the peripheral area of the second substrate, wherein, on the first substrate, at least one first obstructing frame is formed between the sealant and the display area of the first substrate; on the second substrate, at least one second obstructing frame is formed between the sealant and the display area of the second substrate; the first obstructing frame and the second obstructing frame are disposed at an interval and parallel to each other; each of the first obstructing frame and second obstructing frame has a thickness smaller than a cell gap, and a sum of the thicknesses of a pair of the first obstructing frame and second obstructing frame that are adjacent to each other is greater than the cell gap, and wherein the cell gap is the distance between the first substrate and the second substrate after assembled face to face.

Another embodiment of the present invention provides method of manufacturing a liquid crystal display (LCD) panel, comprising:

step 1, providing a first substrate and a second substrate, each having a display area and a peripheral area around the display area;

step 2, forming at least one first obstructing frame in the peripheral area of the first substrate, and forming at least one second obstructing frame in the peripheral area of the second substrate, wherein a thickness of each of the first obstructing frame and the second obstructing frame is smaller than a cell gap, and the sum of the thicknesses of a pair of the first and second obstructing frame that are adjacent to each other is greater than the cell gap, wherein the cell gap is the distance between the first substrate and the second substrate after assembled face to face;

step 3, dropping liquid crystal in the display area of the first substrate or the second substrate, applying sealant in the peripheral area of the first substrate or the second substrate, assembling the first and second substrate face to face, wherein the first obstructing frame is disposed between the sealant and the display area of the first substrate, the second obstructing frame is disposed between the sealant and the display area of the second substrate, and the first obstructing frame and the second obstructing frame are disposed at an interval and parallel to each other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

To more explicitly describe the embodiments according to the present invention, the drawings for the embodiments are briefly described. As well known, the drawings as described below are merely some embodiments of the invention; from the drawings, one of ordinary skill in the art can obtain other drawings without any inventive work.

DETAILED DESCRIPTION OF THE PREFERRED EMBODIMENTS

Hereinafter, with references to the accompanying drawings, an explicit and complete description will be given to the embodiments according to the invention. Obviously, the embodiments described herein are only part of, not all of, the embodiments according to the invention. Based on the embodiments of the current application and without any inventive work, one of ordinary skill in the art can obtain other embodiments, all of which fall into the scope of this invention.

A liquid crystal display (LCD) panel of an embodiment according to the invention may include a first substrate and a second substrate, disposed opposite to each other and each having a display area and a peripheral area around the display area. Liquid crystal is filled between the display area of the second substrate and that of the first substrate so as to form a liquid crystal layer. Sealant is formed between the peripheral area (i.e., non-display area) of the second substrate and that of the first substrate, along the periphery of the liquid crystal. On the first substrate, one or more obstructing frames (referred to as the first obstructing frames hereinafter) are formed between the sealant and the display area of the first substrate; and on the second substrate, one or more obstructing frames (referred to as the second obstructing frames hereinafter) are formed between the sealant and the display area of the second substrate. The first obstructing frame and second obstructing frame are disposed at an interval and parallel to each other. Each of the first obstructing frame and second obstructing frame has a thickness smaller than the cell gap (thickness of the liquid crystal cell), and the sum of the thicknesses of the first and the second obstructing frame that are adjacent to each other is greater than the cell gap.

For a TFT-LCD, the two substrates, assembled face to face to form a LCD panel, comprise a CF substrate and an array substrate. The first substrate being a CF substrate, the second substrate is an array substrate; the first substrate being an array substrate, the second substrate is a CF substrate. The embodiments of the invention will be described in detail, in which the first substrate of the LCD panel is set as the array substrate, and the second substrate as the CF substrate, even though the invention is not limited to that.

Embodiment 1

Figure 1:
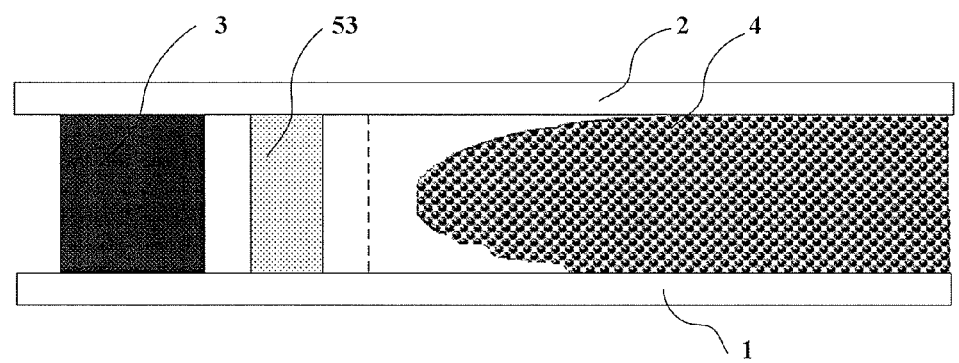
FIG. 1 is an sectional view of a conventional LCD panel.
Figure 2:
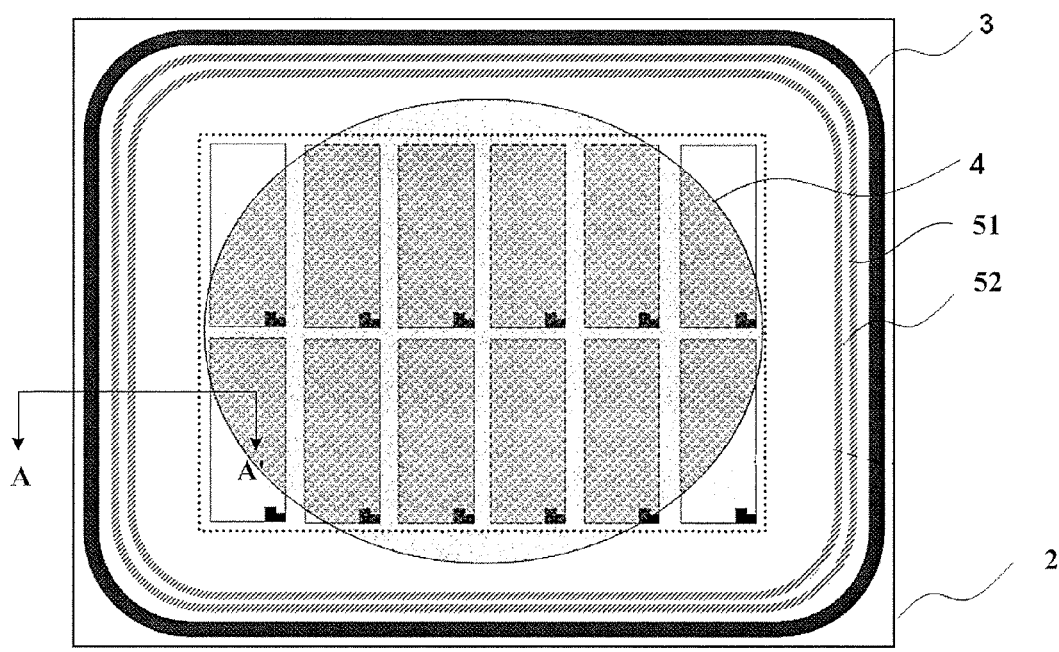
FIG. 2 is a top view of a LCD panel during the process of liquid crystal diffusion of the first embodiment according to the invention.
Figure 3:
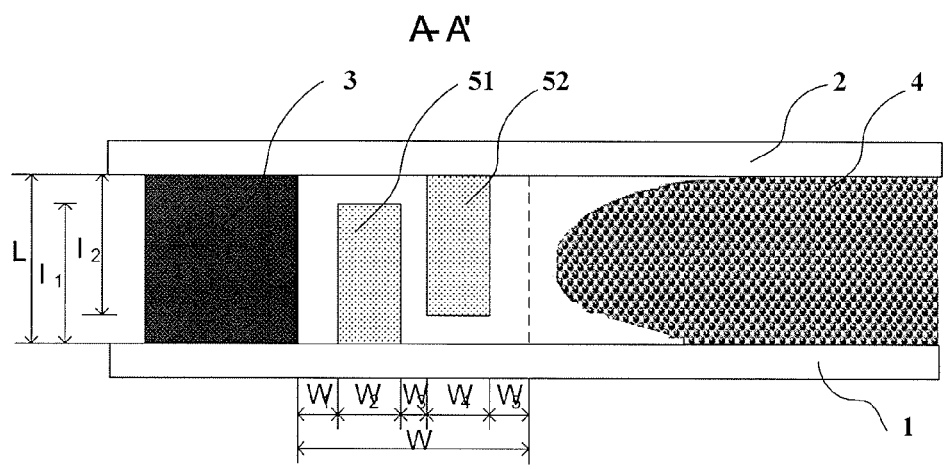
FIG. 3 is a sectional view taken along A-A' of the LCD panel shown in FIG. 2.

FIG. 2 is a top view of a LCD panel during the process of liquid crystal diffusion of the first embodiment according to the invention; FIG. 3 is the sectional view taken along A-A' of the LCD panel shown in FIG. 2.

As shown in FIGS. 2 and 3, a LCD panel of the embodiment includes an array substrate 1 and a CF substrate 2, which are disposed opposite to each other to form a liquid crystal cell; the display area (as the areas denoted with the dashed line in FIGS. 2 and 3) of the CF substrate 2 corresponds to display area of the array substrate 1, and the peripheral area (i.e., the non-display area) of the CF substrate 2 corresponds to the peripheral area of the array substrate 1. The space between the display area of the CF substrate 2 and that of the array substrate 1 is a liquid crystal filling portion, where liquid crystal 4 is filled to form a liquid crystal layer. Sealant 3 is formed between the peripheral area of the CF substrate 2 and that of the array substrate 1, along the periphery of the liquid crystal layer in a frame shape. On the array substrate 1, a first obstructing frame 51 is formed between the sealant 3 and the display area of the array substrate 1; on the CF substrate 2, a second obstructing frame 52 is formed between the sealant 3 and the display area of the CF substrate 2. The first obstructing frame 51 and the second obstructing frames 52 are disposed at an interval and parallel to each other, i.e., the first obstructing frame 51 parallels the second obstructing frames 52; however an interval is left between the two obstructing frames 51 and 52, thus the two obstructing frames 51 and 52 do not overlap each other. In addition, an interval is left between the first obstructing frame 51 and the sealant 3, and also an interval is left between the second obstructing frame 52 and the periphery of the display area. The materials for the first obstructing frame 51 and the second obstructing frame 52 may include: the material for forming black matrix, the resin material for spacers, or other nonmetal materials. FIGS. 2 and 3 merely demonstrate the distribution of the liquid crystal during the process of liquid crystal diffusion. As one of ordinary skill in the art can understand, after the liquid crystal diffusion is finished, liquid crystal may also be filled between the second obstructing frame 52 and the array substrate 1, between the first obstructing frame 51 and the second obstructing frame 52, between the first obstructing frame 51 and the CF substrate 51, and between the first obstructing frame 51 and the sealant 3.

Referring to FIG. 3, assume the distance between the assembled first and second substrate, namely the cell gap of the LCD panel, is L, the thickness of the first obstructing frame is and the thickness of the second obstructing frame is $l_2$. Each of the thicknesses of the first and second obstructing frame $l_1$ and $l_2$ is smaller than the cell gap L, and the sum of the thicknesses ($l_1+l_2$) of a pair of the first and second obstructing frame that are adjacent to each other is greater than the cell gap L, i.e., L, $l_1$, and $l_2$ fulfill Eq. (1):

$$0 < l_1 < L, 0 < l_2 < L, \text{and } L < l_1 + l_2 < 2L \quad (1)$$

Preferably, L, $l_1$, and $l_2$ fulfill Eq. (2)

$$0.5L < l_1 < L, 0.5L < l_2 < L, \text{and } L < l_1 + l_2 < 2L \quad (2)$$

Notwithstanding that FIG. 3 shows the case where the first obstructing frame thickness $l_1$ equals the second obstructing frame thickness $l_2$, as is well known to one of ordinary skill in the art, provided that Eq. (1) or Eq. (2) is fulfilled, the first obstructing frame thickness $l_1$ and the second obstructing frame thickness $l_2$ can be endowed with distinct values.

Let W signify the distance between the sealant 3 and the periphery of the display area (denoted by the dashed line in FIG. 3), W can be expressed with Eq. (3)

$$W = W_1 + W_2 + W_3 + W_4 + W_5 \quad (3)$$

In Eq. (3), $W_1$ stands for the distance between the first obstructing frame 51 and the sealant 3; $W_2$ signifies the width of the sides of the first obstructing frame 51; $W_3$ denotes the distance between the first and second obstructing frame 51 and 52; $W_4$ stands for the width of the sides of the second obstructing frame; and $W_5$ signifies the distance between the second obstructing frame 52 and the periphery of the display area. $W_1$, $W_2$, $W_3$, $W_4$, and $W_5$ are all natural numbers, greater than 0, the particular values of them can be predetermined as needed. Preferably, 10 μm≤$W_2$≤100 μm, 5 μm≤$W_3$≤50 μm, 10 μm≤$W_4$≤100 μm.

In the conventional configuration, the thickness of the obstructing frame in the peripheral area of a LCD area is slightly greater than or equal to the thickness of the liquid crystal cell. Accordingly, while a LCD panel is in use, the obstructing frame completely insulates the display area from the peripheral area, i.e., the liquid crystal in the display area can not enter the peripheral area. In the case where a LCD panel is under the influence from outside (e.g., subject to high temperature, impact, or pressing), the LCD panel may deform, the cell gap of the deformed LCD panel may become greater than that at a normal state, in such a case there exists a discrepancy between the thickness of the obstructing frame and the thickness of the cell gap, i.e., a gap may be formed between the display area and the peripheral area, the liquid crystal can flow into the peripheral area through the gap. After the external factors causing the deformation of the LCD panel vanish (e.g., the temperature lowers to the regular temperature, or the impact or pressing is withdrawn), the cell gap of the LCD panel returns to the normal state. At the normal state, the thickness of the obstructing frame matches the cell gap, i.e., the gap between the display area and the peripheral area disappears, and the display area and the peripheral area are completely insulated from each other by the obstructing frame; in such a case, if some liquid crystal remains in the peripheral area, the liquid crystal in the peripheral area is not able to flow back to the display area, which causes the total amount of the liquid crystal decreases more or less relatively to that before the deformation, and thus adversely affects the product quality and the display characteristics of the LCD panel.

Distinguishable from the structure of the conventional LCD panel, each of the first and second obstructing frame of the embodiment has a thickness smaller than the cell gap, and the sum of the thicknesses of each pair of the first and second obstructing frame is greater than the cell gap. Obviously, in the embodiment, neither the thickness of the first obstructing frame nor that of the second obstructing frame equals the cell gap of the liquid display panel. Such a configuration demonstrates at least the following advantages:

1. With the first and second obstructing frame 51 and 52, the rate of the diffusion of the liquid crystal 4 in the peripheral area during the assembling process can be effectively reduced, which reduces the chance of pollution to the liquid crystal by the not-fully-hardened sealant during the assembling process of the LCD panel. As shown in FIG. 3, with the first and second obstructing frame 51 and 52, the passage between the sealant 3 and the display area is a zigzag shape path. When diffusing from the central portion of the display area into the peripheral area, only through the zigzag shape path can the liquid crystal 4 flow into the peripheral area and come into contact with the sealant 3. Since the resistance the liquid crystal 4 encounters when flowing through the zigzag shape path is remarkably higher than that through a straight passage, the liquid crystal 4 shows a remarkably reduced rate when diffusing in the periphery of the display area relatively to that in an LCD panel without the first and second obstructing frame 51 and 52. Accordingly, it takes more time for the liquid crystal 4 to diffuse from the display area to the peripheral area and to come into contact with the sealant 3, which offers enough time for the sealant 3 to harden, and thus reduces the chance of pollution to the liquid crystal 4 by the not-fully-hardened sealant during the assembling process of a LCD panel.

2. When a LCD panel works in a normal state, there are gaps between the first obstructing frame 51 and the CF substrate 2 and between the first obstructing frame 52 and the array substrate 1, respectively, through which the liquid crystal in the peripheral area is able to flow back to the display area. In the case where a LCD panel is under the influence from outside (e.g., subject to high temperature, impact, or pressing), the LCD panel may deform, yet the liquid crystal in the display area can still diffuse into the peripheral area through the apertures. After the external factors causing the deformation of the LCD panel vanish (e.g., the temperature lowers to the regular temperature or the impact or press is withdrawn), the liquid crystal remaining in the peripheral area can as well flow back to the display area through the gaps, which renders the total amount of the liquid crystal unchanged, favorable to improving of the product quality and the stability of the display characteristics of the LCD panel.

Embodiment 2

Figure 4:
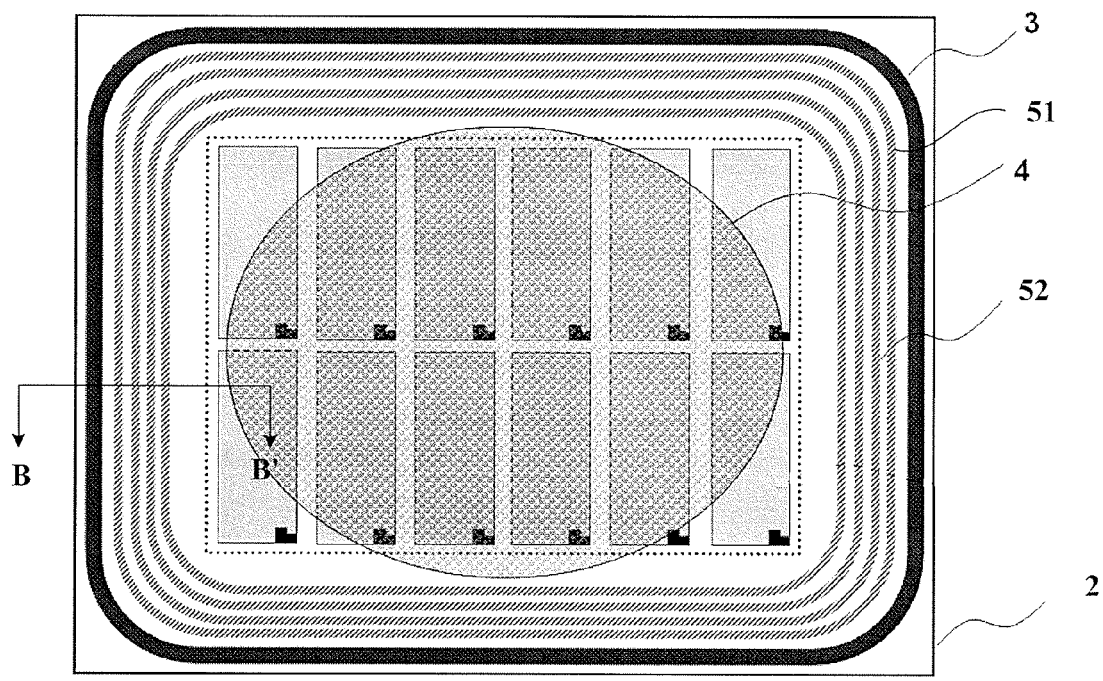
FIG. 4 is a top view of a LCD panel during the process of liquid crystal diffusion of the second embodiment according to the invention.
Figure 5:
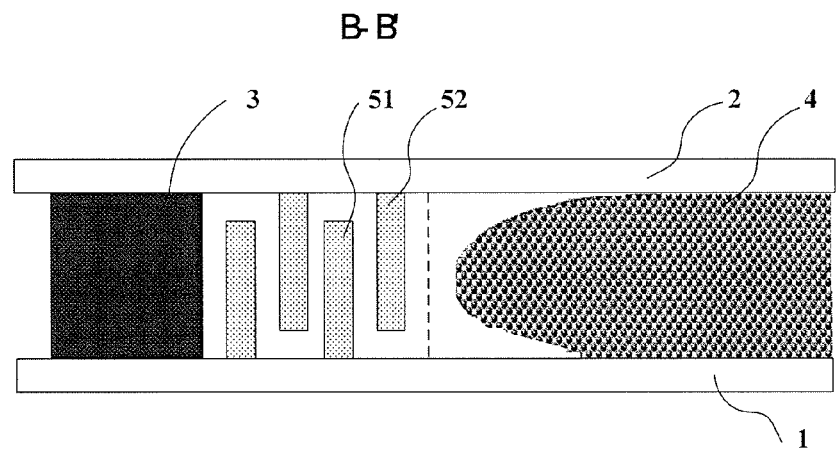
FIG. 5 is a sectional view taken along B-B' of the LCD panel shown in FIG. 4.

FIG. 4 is a top view of a LCD panel during the process of liquid crystal diffusion of the second embodiment according to the invention; FIG. 5 is the sectional view taken along B-B' of the LCD panel shown in FIG. 4.

As shown in FIGS. 4 and 5, the current embodiment differs from the first embodiment in that, two first obstructing frames 51 are formed in the peripheral area of the array substrate 1, and two second obstructing frames 52 are formed in the peripheral area of the CF substrate 2. The first obstructing frames 51 and the second obstructing frames 52 are disposed parallel to each other, in alternation, and at equal intervals. FIGS. 4 and 5 merely demonstrate the distribution of the liquid crystal during the process of liquid crystal diffusion. As one of ordinary skill in the art can understand, after the liquid crystal diffusion is finished, liquid crystal may also be filled between the second obstructing frames 52 and the array substrate 1, between the first obstructing frames 51 and the second obstructing frames 52, between the first obstructing frames 51 and the CF substrate 2, and between the first obstructing frames 51 and the sealant 3.

On the basis of the previous embodiments, the current embodiment increases the number of the first obstructing frames formed on the array substrate and that of the second obstructing frames formed on the CF substrate. With the obstructing structure formed through orderly disposing the first and second obstructing frames, the embodiment enhances the effect of reducing the rate at which the liquid crystal diffuses in the periphery of the display area, which further reduces the chance of pollution to the liquid crystal by the not-fully-hardened sealant during the assembling process of a LCD panel.

As one of ordinary skill in the art can understand, with the inspiration of the technique of the embodiment, one may vary the number of the first and second obstructing frames and the arrangement thereof. For example, two first obstructing frames and one second obstructing frame are disposed in alternation and parallel to one another; or one first obstructing frame and two second obstructing frames are disposed in alternation and parallel to one another; or a plurality of first obstructing frames and a plurality of two obstructing frames are disposed in alternation and parallel to one another. The various modified embodiments share the same mechanism with the current embodiment, and thus their descriptions are omitted for simplicity.

Embodiment 3

Figure 6:
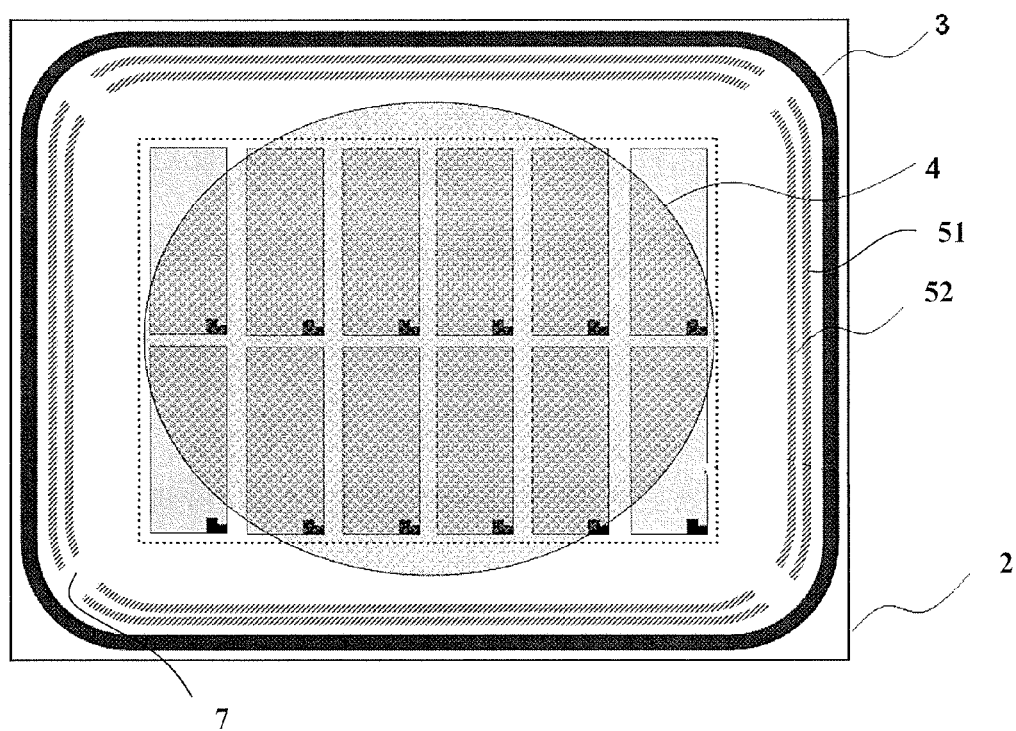
FIG. 6 is a top view of a LCD panel of the third embodiment according to the invention.

FIG. 6 is a top view of a LCD panel of the third embodiment according to the invention.

As shown in FIG. 6, the current embodiment differs from the first embodiment in that, the sections in the plane parallel to the substrate 2 of the first obstructing frame 51 and the second obstructing frame 52 have the shape of a curved-corner rectangle, with openings 7 that connect the peripheral area and the display area formed at the curved corners of the curved-corner rectangle.

During the assembling process of an LCD panel, due to the internal tension of liquid crystal, the liquid crystal 4 shows a ellipsoidal track when diffusing from the central portion of the display area to the peripheral area; obviously, the probability where the liquid crystal 4 diffuses into the peripheral area through the four curved corners of the first and second obstructing frame 51 and 52 and comes into contact with the sealant 3 is small relatively to the probability where the liquid crystal 4 diffuses into the peripheral area through the non-corner portion of the first and second obstructing frame 51 and 52 and comes into contact with the sealant 3. Forming the openings 7 at the curved corners of the obstructing frames 51 and 52 with a curved-corner rectangle shape, therefore, barely affects the effect of reducing the diffusing rate at which the liquid crystal 4 diffuses in the periphery of the display area; while it helps the liquid crystal that has diffused into the peripheral area due to the deformation to readily flow back to the display area after the external factors causing the deformation of the LCD panel vanish.

As the above analysis shows, on the basis of the technique in the previous embodiments, the current embodiment further provides openings at the curved corners of the curved-corner rectangular of the first and second obstructing frame, which is more favorable to keep a stable total amount of the liquid crystal in the display area of a LCD panel unchanged, and thus is more favorable to improve the display quality and the stability of display characteristics of a LCD panel.

The present invention also provides a manufacturing method for the aforementioned LCD panels Embodiment 4

The fourth embodiment of the invention provides a manufacturing method of a LCD panel. The LCD panel manufacturing method may comprise the following steps.

Step 1, providing a first substrate and a second substrate, each having a display area and a peripheral area around the display area. The first substrate and the second substrate can be prepared by any existing process or any process to be developed in the future.

Step 2, forming at least one first obstructing frame in the peripheral area of the first substrate, and forming at least one second obstructing frame in the peripheral area of the second substrate, wherein each of the thickness of the first and second obstructing frames is smaller than a cell gap, and the sum of the thicknesses of a pair of the first and second obstructing frame that are adjacent to each other is greater than the cell gap, and wherein the cell gap is the distance between the first substrate and the second substrate after assembled face to face.

Step 3, dropping liquid crystal in the display area of the first substrate or the second substrate, applying sealant in the peripheral area of the first substrate or the second substrate, assembling the first and second substrate face to face, wherein the at least one first obstructing frame is disposed between the sealant and the display area of the first substrate, the at least one second obstructing frame is disposed between the sealant and the display area of the second substrate, and the at least one first and second obstructing frame are disposed at an interval and parallel to each other.

In the above described method, the first substrate being a CF substrate, the second substrate is an array substrate; the first substrate being an array substrate, the second substrate is a CF substrate. Liquid crystal can be drop-filled in the display area of one substrate, the first substrate or the second substrate, and the sealant can be applied in the peripheral area of the other substrate. Alternatively, liquid crystal can be dropped in the display area of one substrate, the first substrate or the second substrate, and the sealant can be applied in the peripheral area of the same substrate.

Preferably, each of the first and/or second obstructing frames has a thickness between 0.5 time the cell gap and 1 time the cell gap. Each of the first and/or second obstructing frames may have a width between 10 μm and 100 μm. The materials for the first obstructing frame 51 and the second obstructing frame 52 can include: the material for the black matrix, the resin material for spacers, or other nonmetal materials. Alternatively, the first obstructing frame and/or the second obstructing frames can be shaped as a curved-corner rectangle, and can further have openings formed at the curved-corners to connect the peripheral area and the display area.

In particular, patterning processes can be employed to prepare the first and second obstructing frame described above. Hereinafter, description is given with an example where the black matrix material is employed to produce the first obstructing frame: applying, on the first substrate, a layer of black matrix material, whose thickness is equal to the predetermined thickness of the first obstructing frames; positioning a photomask for photolithography on the first substrate applied with a layer of black matrix, and forming a pattern of the first obstructing frames on the first substrate with the processes of exposing, developing, and etc. on the black matrix material. The same method can be used to produce the second obstructing frames on the second substrate. Based on the material for the first and second obstructing frames, one can select proper producing processes, e.g., one can use methods such as mask depositing and vapor deposition to produce the first and second obstructing frames.

The current embodiment provides the first and second obstructing frames that comply with the aforementioned thickness condition, which effectively reduces the rate at which liquid crystal diffuses in the periphery of the display area during the assembling process, and thus reduces the chance of pollution to the liquid crystal by the not-fully-hardened sealant during the assembling process of a LCD panel. While a LCD panel works in a normal state, there are gaps between the first obstructing frame and the second substrate and between the second obstructing frame and the first substrate, through which the liquid crystal in the peripheral area is able to flow back to the display area, which renders the total amount of the liquid crystal unchanged, favorable to improving of the display quality and stability of display characteristics of a LCD panel.

Lastly, the embodiments above are employed to describe, not to limit the technique of the present invention. Although detailed description is give with references to the embodiments as above, on of ordinary skill in the art understands: the technique embodied in the above embodiments can be modified, or some technical features can be substituted with the equivalents; such modifications or substitutions do not deviate the nature of the technique from the spirit and scope of the technique embodied in the embodiments according to the invention.

What is claimed is:

1. A liquid crystal display (LCD) panel, comprising
    a first substrate and a second substrate assembled face to face, each having a display area and a peripheral area around the display area,
    liquid crystal filled between the first substrate and the second substrate, and
    sealant formed between the peripheral area of the first substrate and the peripheral area of the second substrate,
    wherein, on the first substrate, at least one first obstructing frame is formed side by side with the sealant and between the sealant and the display area of the first substrate; on the second substrate, at least one second obstructing frame is formed side by side with the sealant and between the sealant and the display area of the second substrate; the first obstructing frame and the second obstructing frame are disposed at an interval and parallel to each other; each of the first obstructing frame and second obstructing frame has a thickness smaller than a cell gap, and a sum of the thicknesses of a pair of the first obstructing frame and second obstructing frame that are adjacent to each other is greater than the cell gap, and wherein the cell gap is the distance between the first substrate and the second substrate after assembled face to face; and wherein a thickness of each of the first obstructing frame and the second obstructing frame is more than 0.5 time the cell gap and less than 1 time the cell gap, and wherein at least the first obstructing frame and at least the second obstructing frame are not directly in contact with the sealant; and the first obstructing frame and the second obstructing frame are in a curved-corner rectangle shape, and openings that connect the peripheral area and the display area are formed at the curved corners of the curved-corner rectangle.

2. The LCD panel according to claim 1,
wherein, on the first substrate, two first obstructing frames are formed between the sealant and the display area of the first substrate, the two first obstructing frames and the second obstructing frame are disposed parallel to each other, in alternation, and at an interval between 5 μm~50 μm.

3. The LCD panel according to claim 1,
wherein on the second substrate, two second obstructing frames are formed between the sealant and the display area of the second substrate, the two second obstructing frames and the first obstructing frame are disposed parallel to each other, in alternation, and at an interval between 5 μm~50 μm.

4. The LCD panel according to claim 1,
wherein on the first substrate, a plurality of first obstructing frames are formed between the sealant and the display area of the first substrate, on the second substrate, a plurality of second obstructing frames are formed between the sealant and the display area of the second substrate, the plurality of first obstructing frames and the plurality of second obstructing frames are disposed parallel to each other, in alternation, and at an interval between 5 μm~50 μm.

5. The LCD panel according to claim 1
wherein each of the first obstructing frame and the second obstructing frame has a width of 10 μm~100 μm.

6. The LCD panel according to claim 1
wherein the first obstructing frame and/or the second obstructing frame are made of a non-metal material layer.

7. The LCD panel according to claim 6
wherein the non-metal material layer include a black matrix material layer or a spacer resin material layer.

8. A method of manufacturing a liquid crystal display (LCD) panel, comprising:
step 1, providing a first substrate and a second substrate, each having a display area and a peripheral area around the display area;
step 2, forming at least one first obstructing frame in the peripheral area of the first substrate, and forming at least one second obstructing frame in the peripheral area of the second substrate, wherein a thickness of each of the first obstructing frame and the second obstructing frame is smaller than a cell gap, and a sum of the thicknesses of a pair of the first and second obstructing frame that are adjacent to each other is greater than the cell gap, wherein the cell gap is the distance between the first substrate and the second substrate after assembled face to face;
step 3, dropping liquid crystal in the display area of the first substrate or the second substrate, applying sealant in the peripheral area of the first substrate or the second substrate, assembling the first and second substrate face to face, wherein the first obstructing frame is disposed side by side with the sealant and between the sealant and the display area of the first substrate, the second obstructing frame is disposed side by side with the sealant and between the sealant and the display area of the second substrate, and the first obstructing frame and the second obstructing frame are disposed at an interval and parallel to each other; and wherein a thickness of each of the first obstructing frame and the second obstructing frame is more than 0.5 time the cell gap and less than 1 time the cell gap, and wherein at least the first obstructing frame and at least the second obstructing frame are not directly in contact with the sealant; and the first obstructing frame and the second obstructing frame are in a curved-corner rectangle shape, and openings that connect the peripheral area and the display area are formed at the curved corners of the curved-corner rectangle.

9. The method according to claim 8,
wherein, on the first substrate, two first obstructing frames are formed between the sealant and the display area of the first substrate, the two first obstructing frames and the second obstructing frame are disposed parallel to each other, in alternation, and at and interval between 5 μm~50 μm.

10. The method according to claim 8,
wherein, on the second substrate, two second obstructing frames are formed between the sealant and the display area of the second substrate, the two second obstructing frames and the first obstructing frame are disposed parallel to each other, in alternation, and at and interval between 5 μm~50 μm.

11. The method of manufacturing a LCD panel according to claim 8,
wherein, on the first substrate, a plurality of first obstructing frames are formed between the sealant and the display area of the first substrate; on the second substrate, a plurality of second obstructing frames are formed between the sealant and the display area of the second substrate, the plurality of first obstructing frames and the plurality of second obstructing frames are disposed parallel to each other, in alternation, and at an interval between 5 μm~50 μm.

12. The method according to claim 8,
wherein each of the first obstructing frame and the each second obstructing frame has a width of 10 μm~100 μm.

13. The method according to claim 8,
wherein the first obstructing frames and/or the second obstructing frames are made of a non-metal material layer.

14. The method according to claim 8,
wherein the non-metal material layer includes a black matrix material layer or a spacer resin material layer.

15. A liquid crystal display (LCD) panel, comprising
a first substrate and a second substrate assembled face to face, each having a display area and a peripheral area around the display area,
liquid crystal filled between the first substrate and the second substrate, and
sealant formed between the peripheral area of the first substrate and the peripheral area of the second substrate,
wherein, on the first substrate, at least one first obstructing frame is formed side by side with the sealant and between the sealant and the display area of the first substrate; on the second substrate, at least one second obstructing frame is formed side by side with the sealant and between the sealant and the display area of the second substrate; the first obstructing frame and the second obstructing frame are disposed at an interval and parallel to each other; each of the first obstructing frame and second obstructing frame has a thickness smaller than a cell gap, and a sum of the thicknesses of a pair of the first obstructing frame and second obstructing frame that are adjacent to each other is greater than the cell gap, and wherein the cell gap is the distance between the first substrate and the second substrate after assembled face to face;
wherein the first obstructing frame and/or the second obstructing frame are made of a black matrix material layer or a spacer resin material layer, and
wherein at least the first obstructing frame and at least the second obstructing frame are not directly in contact with the sealant; and
the first obstructing frame and the second obstructing frame are in a curved-corner rectangle shape, and openings that connect the peripheral area and the display area are formed at the curved corners of the curved-corner rectangle.

* * * * *